June 27, 1967
E. D. DAVIS
3,328,611
THERMIONIC CONVERTER
Filed May 25, 1964
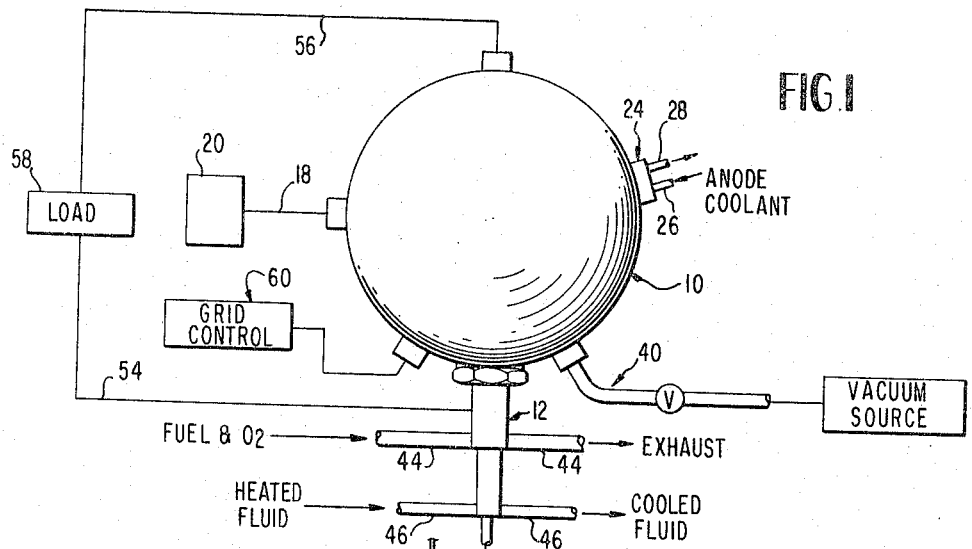
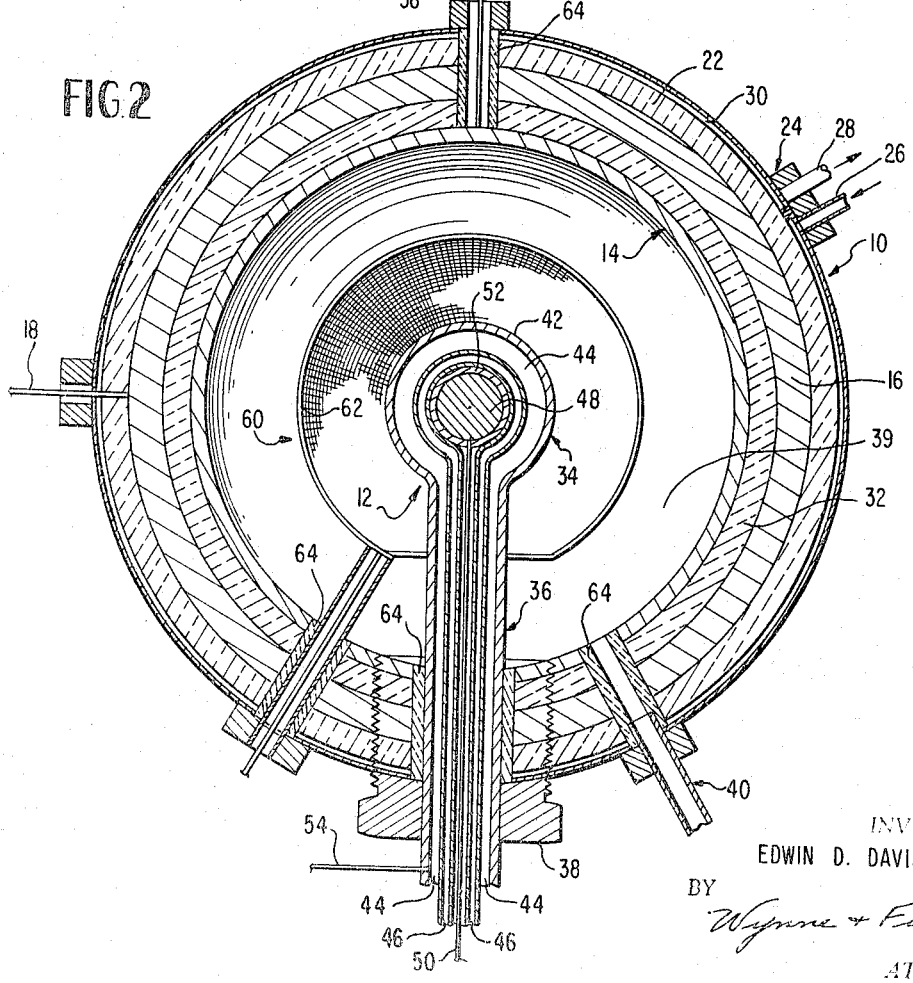
INVENTOR.
EDWIN D. DAVIS
BY
Wynne & Finken
ATTORNEYS

United States Patent Office 3,328,611
Patented June 27, 1967

3,328,611
THERMIONIC CONVERTER
Edwin D. Davis, 1723 Crescent Ridge Road,
Daytona Beach, Fla. 32018
Filed May 25, 1964, Ser. No. 369,931
8 Claims. (Cl. 310—4)

My invention relates to a thermionic converter and the method for its use. More specifically, my invention relates to a thermionic converter having a cathode with an electron emissive surface, a chargeable control member for producing an obligatory flow of electrons, and an anode positioned between and spaced from the cathode and control member for collecting the electrons.

My method involves the use of the thermionic converter generally described, the cathode being heated by any suitable means, the control member being charged to a high positive potential and electrical conductors being connected to the cathode and anode to provide an electrical potential therebetween in accordance with the electrons collected by the anode.

The problems of obtaining satisfactory efficiencies from thermionic converters are discussed in recently issued patents such as Milligan 3,089,079, Caldwell Re. 24,879, and Opfermann 3,079,527. It is an object of my invention to eliminate the problems involved in the formation of a space charge in thermionic converters by eliminating the grid and by utilizing a control member charged to a high potential for producing the electron flow.

It is among the objects of my invention to provide an apparatus and the necessary processes for the conversion of heat and radiation energies directly into electrical current, these processes providing for low cost manufacture, low cost maintenance, as well as simplicity of design and operation.

Another important factor is to provide a high electrical output per unit weight which is usable in small devices and as well may fill the needs of large industrial uses—depending on the size and capacity desired.

It becomes evident, due to the simplicity of principle, construction and operation, that great savings in labor of manufacture, maintenance and operation will be effected.

This invention could and would utilize directly an available high temperature source, including combustion processes, nuclear reaction, decomposition of radioactive isotopes, coolant products from atomic piles and utilization of radiant energy produced locally on earth or produced and used in other parts of space in the solar system.

My invention would embody the feasibility of unit replacement of any or all elements subject to traumatic or external injurious instances as well as disintegration and deterioration through usage under maximum conditions over a long period of time.

This unit alone may produce direct current and, by the use of alternator or other devices, this unit may be converted to alternating current. If a pair of these units are used together, alternating current can be generated with no loss of potential output to either unit.

In this invention or converter, the "space charge" will be eliminated by utilizing a strong magnetic or static field on the control member, thus causing all electrons to enter onto and remain in the anode or collecting sphere. The electrons will travel a direct path from the hot cathode to the cooler collector or anode. There will be no nefarious, tangential or semi-circular pathways for the electrons to traverse. Due to the outside charged sphere or field the electrons will progressively accelerate toward the anode once they have been set free from the hot cathode. In previous devices the free electron or electrons have been set free from the cathode with a potential energy of Wc with respect to the Fermi energy level of the cathode and with a kinetic energy equal to the thermal energy of the electron; the potential energy of each free electron decreases as it approaches the anode. In my device the potential energy remains constant and the kinetic energy increases as the electrons approach the collector or anode. The combination of potential and kinetic energy is then used to produce electric current.

In previous devices the electrons from the hot cathode have been attracted from the hot cathode by a charged grid intervening between the cathode and the collector or anode. The previous devices depended on chance to determine which electrons would strike the grid and be useless and which electrons would penetrate the grid and go to the anode. In these previously constructed apparati the "space charge" was a serious handicap, and after electrons built up on the anode the electrons would then be attracted back to the grid and the machine would no longer produce a current. In previous devices certain of the electrons follow "an ideal trajectory" and thus are effective. Many other electrons, however, are adversely affected and will deflect from ideal paths. These latter electrons are not only ineffective but add to the magnitude of the "space charge" and decrease the effectiveness of the electrons in ideal trajectory.

In this invention I would like to reiterate that the defects found in previous devices will be eliminated; that is to say, the electrons will travel a free and direct path without interference. The energy of the electrons will increase in their path from the cathode to the anode. There will be no charged grid to collect electrons intended for the collection plate or anode; there will be no "space charge" to decrease effectiveness after a short time of operation; there will be no adversely affected electrons deflected from their paths; there will be no limitation of operational voltages which are proportional to the ionization potential of metals or alkali vapor. (The voltage can be unlimited and is directly proportional to the strength of the static charge or magnetic field produced about the charged plate.) This device can be used either as a direct current or alternating current thermionic converter. There will be no finite limit put on the volume of current or the amperage available but this will be dependent on metallurgy developments and is limited by the temperature to which the cathode can be heated before the melting point is reached.

Other objects and advantages of my invention will become more apparent from the following detailed description thereof made principally with reference to the embodiment shown in the accompanying drawing in which:

FIG. 1 is a schematic drawing of my thermionic converter system; and

FIG. 2 is a vertical section through my thermionic converter.

Referring now to FIGS. 1 and 2, it will be seen that the thermionic converter 10 includes an inner cathode 12, an outer anode 14 and a chargeable control member 16 positioned outside of the anode 14. Lead 18 and power source 20 provide the means for establishment of a powerfully attractive field on the control member 16, the system shown being adapted to build up a static charge in excess of 10,000,000 volts of static electricity. The amount of this charge is, of course, dependent upon insulation materials used.

An electrically insulating housing means 22 is provided as an outer layer around the control member; the housing means 22 includes anode cooling means 24 which has coolant inlet 26 and outlet 28 providing flow through coolant space 30 in the housing means 22.

An electrically insulating shell 32 is provided between the control member 16 and the anode 14.

Preferably the thermionic converter 10 is spherically designed, the cathode 12 having a central substantially spherical bulb 34 and probe tube 36. The probe tube 36 is mounted in a threaded adapter 38 which is removably screwed into a threaded opening larger than bulb 34, the opening extending through the substantially spherical anode 14, insulating shell 32, control member 16 and housing means 22. It will be noted that the elements through which the probe tube 36 extends may be viewed as substantially spherical laminates equidistantly spaced from the cathode forming a structurally sound unit which can withstand the high pressures produced when the space 39 between the anode and cathode is evacuated by vacuum means 40.

The bulb 34 and probe tube 36 are somewhat schematically depicted to indicate three different types of heat means for heating the electron emissive material on the electron emission surface 42 of the bulb to a temperature of about 1500° C., the anode 14 being maintained at about 500° C.

An outer flow tube 44 is provided through the probe tube to the bulb and back for conducting fuel and oxygen to the bulb and products of combustion from the bulb.

An inner flow tube 46 is similarly provided for conducting hot fluids, liquid or gas, and radioactive substances to provide the heat means for the cathode.

The core 48 in the bulb is connected by lead 50 through the probe tube to enable the placement of a charge on the core, if desired; the insulating liner 52 being sandwiched between the core 48 and the inner flow tube 46.

Electric conductors 54 and 56 connect the cathode 12 and anode 14, respectively, to an electrical load 58.

Since the heat source may prove to be difficult to control, a means 60 is provided for adjusting the effect of the attracting force of the control member on the free emitted electrons. In the embodiment shown this means 60 takes the form of a grid 62 which when charged electrically can be employed to reduce the number of electrons collected by the anode 14. Other methods and means may be employed to control the output such as adjusting the charge on the control member 16, reducing the temperature of the anode, the cathode or increasing the temperature of the anode, reducing the vacuum or introducing an efficiency reducing gas into the vacuum chamber, and adjusting the charge on the cathode. It is believed, however, that an economical method involves the use of the grid 62.

Various control devices known in the art can be used to shut down the converter. The grid 62 for example, could be used for shut down in response to a short circuit in the load to prevent a damming up of electrons on the anode.

Electrical insulation is schematically shown on the drawing as cylinders 64.

I claim:
1. A device for converting heat directly into electricity comprising a cathode having an outer substantially spherical surface including electron emissive material, an anode of substantially spherical shape equidistantly spaced from and surrounding said cathode, a chargeable control member of substantially spherical shape closely spaced to and surrounding said anode, housing means for electrically insulating and housing said cathode, anode and control member, vacuum means for producing a vacuum in the empty space between the cathode and anode, heat means for heating the cathode to a temperature higher than the electron emission temperature of the electron emissive material to free electrons, means for providing a powerfully attractive field on said control member with respect to the free electrons to positively produce an obligatory flow of electrons from the cathode to the anode, and electrical conductors connected to the cathode and anode.

2. A device as defined in claim 1 wherein said control member is substantially spherically coextensive with said anode and a substantially spherical electrically insulating shell is sandwiched therebetween in face-to-face relation therewith.

3. A device as defined in claim 2 and including means to cool the anode below the temperature of the heated cathode.

4. A device as defined in claim 3 and including a grid of substantially spherical shape positioned in free spaced relation between the anode and cathode, and means for producing an electrical potential on said grid to control electron flow from said cathode to said anode to enable control of output at said conductors.

5. A device as defined in claim 1, said cathode having an electron emissive bulb spherically centralized within said anode and a probe tube extending from said bulb outwardly through said housing means, said cathode being removably connected to said housing means.

6. A device as defined in claim 5 wherein said bulb defines a combustion chamber, a fuel delivery tube and a products of combustion tube extending through said probe.

7. A device as defined in claim 5 wherein a radioactive substance is housed in said bulb.

8. A device as defined in claim 5 and wherein a hot fluid conduit extends into and out of said cathode.

References Cited
UNITED STATES PATENTS
3,162,778   12/1964   Durant _____ 310—4

MILTON O. HIRSHFIELD, *Primary Examiner.*

J. W. GIBBS, *Assistant Examiner.*